United States Patent

Katagiri et al.

[11] Patent Number: 5,318,739
[45] Date of Patent: Jun. 7, 1994

[54] METHOD FOR MANUFACTURING MAGNETIC TAPE CASSETTE

[75] Inventors: Shingo Katagiri; Masayoshi Moriwaki, both of Kanagawa, Japan

[73] Assignee: Fuji Photo Film Co., Ltd., Kanagawa, Japan

[21] Appl. No.: 943,113

[22] Filed: Sep. 10, 1992

Related U.S. Application Data

[63] Continuation of Ser. No. 746,215, Aug. 16, 1991, abandoned, which is a continuation of Ser. No. 450,108, Dec. 13, 1989, abandoned.

[30] Foreign Application Priority Data

Dec. 15, 1988 [JP] Japan .................. 63-161773

[51] Int. Cl.5 ............ B29C 45/14; B29C 45/16
[52] U.S. Cl. .................. 264/266; 264/264; 264/265; 264/267
[58] Field of Search .......... 264/259, 255, 263, 264, 264/267, 132, 316, 265, 266

[56] References Cited

U.S. PATENT DOCUMENTS 4,752,059 6/1988 Oishi et al. ............ 264/259
4,825,320 4/1989 Oishi et al. ............ 264/259

FOREIGN PATENT DOCUMENTS 0015062 2/1984 Japan .
0122768 6/1984 Japan .
0026169 2/1985 Japan .
0109238 5/1985 Japan .

Primary Examiner—Jan H. Silbaugh
Assistant Examiner—A. Y. Ortiz
Attorney, Agent, or Firm—Sughrue, Mion, Zinn, Macpeak & Seas

[57] ABSTRACT

A method for manufacturing the half body portions of a magnetic tape cassette or the like having an image transfer layer on its outer surface. An image transfer film is placed in a molding cavity, which film includes a base layer, a matting layer, and an image transfer layer. The function of the matting layer is to roughen the surface of the image transfer layer, while allowing easy subsequent peeling therefrom. A molten plastic is injected into the molding cavity against the image transfer layer. After the resulting product solidifies, the product is removed from the molding cavity, and the base layer and matting layer are peeled from the product, leaving the image transfer layer on an outside surface of the product.

2 Claims, 2 Drawing Sheets

METHOD FOR MANUFACTURING MAGNETIC TAPE CASSETTE

This is a continuation of application Ser. No. 07/746,215 filed Aug. 16, 1991, now abandoned, which is a continuation of application Ser. No. 07/450,108, filed Dec. 13, 1989, now abandoned.

BACKGROUND OF THE INVENTION

The present invention relates to a method for manufacturing magnetic tape cassette, particularly, a magnetic tape cassette the half portions of the body of which are manufactured using an image transfer molding process.

A conventional magnetic tape cassette includes upper and a lower half portions between which are rotatably supported a pair of tape hubs. Each of the half portions is manufactured from a plastic or the like using an injection molding process. After injection molding, paper or the like carrying a prescribed design is adhered to the outside surface of the half portion, or a design is directly printed on the half portion, to thereby enhance the appearance of the cassette. However, since the manufacture of the half portion requires injection molding of the plastic or the like and a subsequent step of adhering the paper or the like or the printing of a design on the outside surface of the half portion, the process is relatively complicated.

To solve this problem, an image transfer molding process in which the prescribed design is printed on the outside surface of the half portion during the injection molding process has been developed, as disclosed in Japanese Unexamined Published Utility Model Applications Nos. 113281/88 and 118782/88. In the image transfer molding process, molten plastic or the like is injected through a gate communicating with a cavity formed between a pair of dies for molding the half portion, and an image layer on a base film disposed in the cavity in advance is transferred onto the outside surface of the half portion by the pressure and heat of the injected molten plastic material. With this process, the manufacture of the half portion is simplified, thereby lowering the cost of the magnetic tape cassette.

In another magnetic tape cassette, the outside surface of each half portion of the body is provided with a roughened part during image transfer molding. Such a cassette is disclosed in Japanese Unexamined Published Utility Model Application No. 2282/88. The roughened part of the outside surface of the cassette body can be written on with an ordinary writing instrument.

In the magnetic tape cassette disclosed in Japanese Unexamined Published Utility Model Application No. 2282/88, an ink layer, which contains pigment grains each having a diameter of about 3 to 10 μm, for example, and is to form an image transfer matte part, is provided as a part of the outside surface of an image transfer layer. The image transfer layer is composed of an adhesive layer, an ink layer, etc., which are shifted onto the outside surface of the half portion of the body of the cassette upon the injection of the molten plastic in to the molding cavity so that the ink layer containing the pigment grains constitutes the roughened part of the outside surface of the half portion. However, if such an ink layer containing pigment grains is provided on the entire outside surface of the half portion, the thickness of the overall image transfer layer is unavoidably increased. In image transfer molding, molten plastic is injected into a molding cavity through which are inserted pins provided in order to form holes such as reference holes, capstan holes and screw holes in the half portion of the cassette body. These pins unavoidably pinch the base film bearing the image transfer layer thereon. After the plastic injected into the cavity has solidified, the half portion is extracted from the dies. The base film is then peeled from the surface of the half portion and the image transfer layer is left on the surface of the half portion. Therefore, if the entire outside surface of the half portion is roughened (matted) in the above-described manner wherein the thickness of the image transfer layer is increased, the parts of the image transfer layer pinched by the pins are likely to be left as residual thin films in the holes of the half portion or stuck to the other parts of the image transfer layer on the outside surface of the half portion. The image transfer layer parts left as residual thin film segments must be removed after the image transfer molding of the half portion. This is a problem.

SUMMARY OF THE INVENTION

The present invention was made in order to solve the above problems.

Accordingly, it is an object of the present invention to provide a method for manufacturing a magnetic tape cassette in which the image transfer molding of each half portion is simplified.

A magnetic tape cassette manufactured in accordance with the present invention includes two half body portions, each of which is manufactured using an image transfer molding process in which at least the part of the image transfer film which is to constitute an image transfer layer on the outside surface of the half body portion is integrally joined to the outside surface. In accordance with the invention, a matting layer is provided between the base of the image transfer film and the image transfer layer and is peeled off together with the base after image transfer molding, whereby the outside surface of the image transfer layer on the outside surface of the base of the half body portion is formed with minute projections and recesses by the matting layer. The matting layer, whose inside surface has projections and recesses, is not left on the outside surface of the image transfer layer adhered to the outside surface of the base of the half body portion, but the outside surface of the image transfer layer is formed with the projections and the recesses corresponding to those of the matting layer. For this reason, the thickness of the image transfer layer is not increased by that of the matting layer.

DESCRIPTION OF THE PREFERRED EMBODIMENTS

Preferred embodiments of the present invention are hereafter described in detail with reference to the attached drawings.

Figure 1:
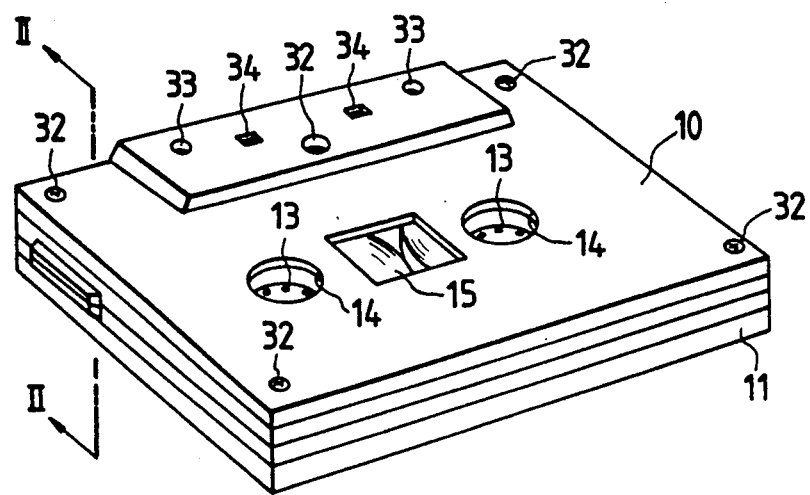
FIG. 1 is a perspective view of a magnetic tape cassette produced according to a preferred embodiment of the present invention.
Figure 2:
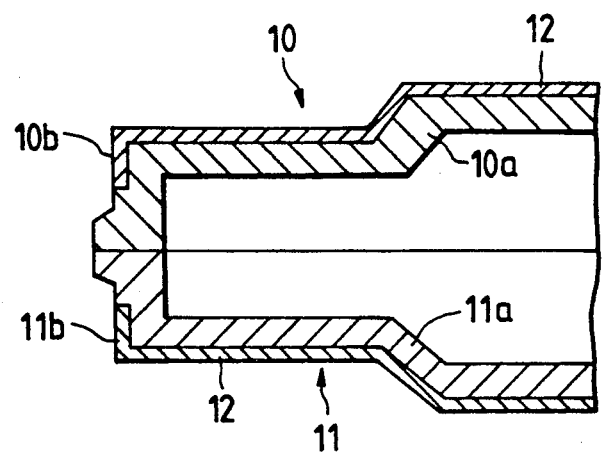
FIG. 2 is a sectional view of the magnetic tape cassette of FIG. 1 taken along a line II—II in FIG. 1.

FIG. 1 is a perspective view of a magnetic tape cassette constructed according to the invention. A pair of hubs 13 on which a magnetic tape 15 is wound are rotatably supported between an upper half portion 10 and a lower half portion 11. The upper and the lower half portions 10 and 11 are manufactured separately by injection molding. The half portions 10 and 11 include base portions 10a and 11a made of an injection-molded plastic such as ABS resin, and image transfer layers 12 coating the outside surfaces of the bases, as shown in FIG. 2, which is a sectional view of the cassette along a line II—II in FIG. 1. It is preferable that the image transfer layers 12, each of which is formed from an image transfer film 20, cover the edges 10b and 11b of the upper and lower half portions 10 and 11 to reinforce the body of the cassette. The half portions 10 and 11 are provided with holes such as capstan holes 33, reference holes 34, and screw holes for screws 32 for securing the half portions to each other.

Figure 3:
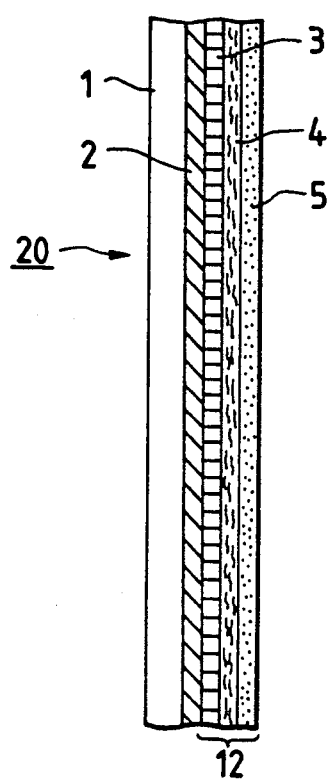
FIG. 3 is a sectional view of an image transfer film for the image transfer molding of each half portion of the body of the magnetic tape cassette.

Each image transfer layer 12 is formed on the half portion 10 or 11 at the same time as the injection molding thereof. For this purpose, the image transfer film 20 is pinched between two dies fitted to each other to perform injection molding wherein the image transfer layer 12 is formed on the outside surface of the half portion 10 or 11. The image transfer film 20 is a band-like film, and includes parts which are disposed in such a manner as to correspond to the dies and to constitute the image layer 12. The film 20 is intermittently and appropriately fed for the injection molding of the half portion 10 or 11. The image transfer film 20 is composed of a base 1, whose inside surface is located in contact with the base 10a or 11a of the half portion 10 or 11, a matting layer 2, a protective layer 3, an ink layer 4, an adhesive layer 5 stacked In the stated order on the inside surface of the base of the film as shown in FIG. 3. The base 1 of the film 20 is a high-molecular substance such as polyethylene, polyethylene terephthalate, polypropylene or cellulose triacetate. The matting layer 2 is a synthetic resin layer made by adding an additive such as a PE wax to a main constituent which is a polymethyl methacrylate containing $SiO_2$ grains each having a diameter of about 5 $\mu$m. The surface of the protective layer 3, which adjoins the matting layer 2, has projections and recesses. The ink layer 4 has a design chosen to enhance the appearance of the body of the cassette. The protective layer 3 is made of an acrylic resin, a rubber chloride resin, or the like, and functions to prevent the ink layer 4 from separating from the base 10a or 11a of the half portion 10 or 11. The adhesive layer 5 adheres the protective layer 3 and the ink layer 4 to the base 10a or 11a so that the layers 3, 4 and 5 constitute the image transfer layer 12 on the outside surface of the base. The matting layer 2 acts as a peeling layer to make it easy to peel the base 1 and the matting layer from the other layers 3, 4 and 5 to leave the layers 3, 4 and 5 on the base 10a or 11a so that the layers 3, 4 and 5 constitute the image transfer layer 12 thereon. For this purpose, the matting layer 2 should be easy to peel from the protective layer 3 but sufficiently adhesive to be difficult to peel from the base 1.

Figure 4:
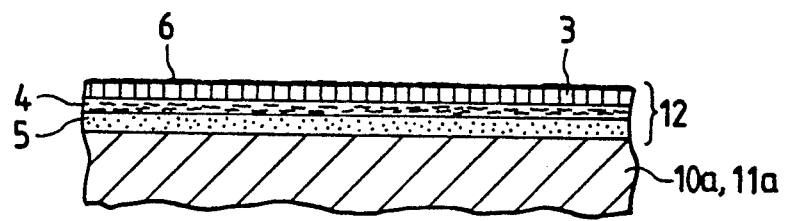
FIG. 4 is an enlarged sectional view of an image transfer layer formed on the half portion from the image transfer film.

Accordingly, after image transfer molding of the half portion 10 or 11 is performed, the base 1 is peeled together with the matting layer 2 from the other layers 3, 4 and 5 adhered to the base 10a or 11a. The layers 3, 4 and 5 are thus left adhered to the base 10a or 11a so that these layers constitute the image transfer layer 12 on the outside surface of the base 10a or 11a, as shown in FIG. 4. Since the matting layer 2 is peeled from the protective layer, the outside surface 6 of the protective layer can be roughened by the corresponding surface of the matting layer 2. The outside surface 6 of the image transfer layer 12 is thus roughened without leaving the matting layer as the outermost part of the image transfer layer. For this reason, the thickness of the image transfer layer 12 is not increased by the thickness of the matting layer 2. Hence, the parts of the image transfer layer 12 which are pinched by the pins used for forming the holes of the half portion 10 or 11 are prevented from being left as residual thin film segments in the holes or stuck to other parts of the image transfer layer.

Although the outside surface of the protective layer 3 is roughened by the matting layer 2 adjoining it in the above-described embodiment, the present invention is not limited to this arrangement, but may be otherwise embodied so that the outside surface of the outermost part of an image transfer layer is roughened by a matting layer provided on the outside surface of the part in advance. The outside surface of the protective layer 3 or outer part of the image transfer layer can be roughened either entirely or partly. Also, the materials of the matting layer 2, the protective layer 3, the ink layer 4, and the adhesive layer 5 may be different from those in the above-described embodiment.

In the production of a magnetic tape cassette in accordance with the present invention, a matting layer is disposed between the base of an image transfer film and the other parts thereof which are to constitute an image transfer layer. The matting layer is peeled together with the base from the other layers after the image transfer molding of each half portion of the body of the cassette so that the outside surface of the image transfer layer adhered to the outside surface of the half portion is roughened by the matting layer. In other words, the matting layer, whose inside surface has minute projections and recesses, is not left on the outside surface of the image transfer layer, but the outside surface is formed with projections and recesses corresponding to those of the matting layer, which is peeled from the image transfer layer. Thus, the thickness of the image transfer layer is not increased by that of the matting layer. As a result, the parts of the image transfer layer which are pinched by pins in the image transfer molding of the half portion are not left as residual thin film segments in the holes of the half portion or adhered to the other parts of the image transfer layer on the outside surface of the half portion. Therefore, it is not necessary to remove such residual thin films from the holes of the half portion following image transfer molding. For this reason, the manufacture of the half portion through image transfer molding with the use of an image transfer film is simplified to provide the magnetic tape cassette of good appearance at a lower cost.

What is claimed is:

1. A method for manufacturing a half body portion of a magnetic tape cassette having a predetermined thickness, comprising the steps of:

providing an image transfer film in a molding cavity, said image transfer film consisting of, in the state order, a base layer, a matting layer, and an image transfer layer, said matting layer comprising a synthetic resin material made by adding PE wax to a main constituent of polymethacrylate containing grains of $SiO_2$, said image transfer layer covering edges of the half body portion of the magnetic tape cassette and consisting of, in the stated order, a protective layer, an ink layer, and an adhesive layer, providing a surface of said matting layer adjacent to an outer layer of said image transfer layer, said matting layer being provided with projections and recesses from said grains, wherein a thickness of said image transfer layer plus a thickness of said magnetic tape cassette substantially equals said predetermined thickness of the half body portion;

injecting a molten plastic into said molding cavity against said adhesive layer of said image transfer layer, allowing projections and recesses corresponding to said projections and recesses of said matting layer to form on and roughen an outside surface of said image transfer layer;

allowing the resulting product to solidify;

removing said product from said molding cavity; and peeling said base layer and said matting layer from said product leaving said image transfer layer on an outside surface of said product roughened with said projections and recesses corresponding to said projections and recesses of said matting layer, wherein the thickness of the product with said base layer and said matting layer peeled therefrom substantially equals said predetermined thickness and is not increased by said matting layer.

2. The method of claim 1 wherein said base layer comprises a high molecular substance selected from the group consisting of polyethylene, polyethylene terephthalate, polypropylene and cellulose triacetate.

* * * * *